United States Patent Office 3,372,749
Patented Mar. 12, 1968

3,372,749
WATERFLOOD PROCESS EMPLOYING
THICKENED WATER
Sherrod A. Williams, Dallas, Tex., assignor to Mobil Oil
Corporation, a corporation of New York
No Drawing. Filed Apr. 18, 1966, Ser. No. 543,012
15 Claims. (Cl. 166—9)

This invention pertains to recovering liquid petroleum hydrocarbons, more commonly called oil, from a subterranean formation. More particularly, it pertains to a method of recovering oil by injecting thickened water through an injection well into the formation to displace the oil therein so that it may be recovered from a production well leading from the surface of the earth to the formation.

Oil accumulated within a subterranean formation can be recovered, or produced, through wells from the formation using the natural energy within the formation. However, producing operations deplete the natural energy relatively rapidly. Thus, a large amount of the oil is left in a subterranean formation if only the natural energy is used to produce the oil. This production by depletion of the natural energy is often referred to as primary production. Where natural formation energy is inadequate or has become depleted, supplemental operations, often referred to as secondary recovery operations, are used to improve the extent of recovery of the oil. In the most successful and most widely used supplemental recovery operations, a fluid is injected through an injection means, comprising one or more injection wells. The fluid is passed into the formation, displacing oil within and moving it through the formation. The oil is produced from production means, comprising one or more production wells, as the injected fluid passes from the injection means toward the production means. In a particular recovery operation of this sort, water is employed as the injected fluid, and the operation is referred to as waterflooding. The injected water is referred to as the flooding water as distinguished from the in-situ, or connate, water.

While conventional waterflooding is effective in obtaining additional oil from an oil-containing subterranean formation, it has a number of shortcomings. Foremost among these shortcomings is the tendency of flooding water to "finger" through an oil-containing formation and to bypass substantial portions thereof. By fingering is meant the developing of unstable bulges or stringers which advance toward the production means more rapidly than the remainder of the flooding water. Furthermore, the water does not normally displace as much oil in the portions of the formation which it contacts as it potentially is capable of doing.

It has been established that waterfloods perform less satisfactorily with viscous oils than with relatively non-viscous oils. The fingering and bypassing tendencies of the water are more or less directly related to the ratio of the viscosity of the oil to the viscosity of the flooding water. The viscosities of different oils vary from as low as 1 or 2 centipoises to 1,000 centipoises, or higher. Water has a viscosity of about 1 centipoise.

Past suggestions for increasing the viscosity of flooding water have included incorporating water-soluble thickening additives in the water. Additives that have been suggested for this purpose include a wide variety of naturally occurring gums, sugars, and polymers. The bacterially produced heteropolysaccharides have been especially interesting as an additive for thickening flooding water.

While these additives are effective to an extent in increasing the viscosity of the flooding water, they also are characterized by one or more serious disadvantages. Some of the additives are effectively only in restricted ranges of temperatures and pH values. Many of the additives form insoluble precipitates with divalent ions, such as calcium ions, either in the flooding water or in the in-situ fluids. A disadvantage suffered by most of the aqueous solutions of these additives is the adverse reduction in viscosity of the aqueous solution when contacted with brines, such as solutions containing sodium chloride or calcium chloride.

Accordingly, it is an object of the invention to provide a method of recovering oil from an oil-containing subterranean formation by flooding oil from the formation with a thickened flooding water which retains its high viscosity in the presence of a wide range of temperatures and pH values.

It is another object of the invention to provide a method of recovering oil from an oil-containing subterranean formation by flooding oil from the formation with a thickened water which does not form objectionable precipitates with divalent ions in the flooding water or in the in-situ fluids.

It is a particular object of the invention to provide a method of recovering oil from an oil-containing subterranean formation by flooding oil from the formation with a thickened flooding water which retains its high viscosity in the presence of brines, either as the flooding water or in the formation.

Further objects and attendant advantages of the invention will be apparent from the following description.

The objects are accomplished in accordance with the invention as follows. Oil is recovered from an oil-containing subterranean formation penetrated by an injection means and a production means by injecting through the injection means and into the formation flooding water which has been thickened by addition of a poly(glucosylglucan), the glucosylglucan having the following structural formula:

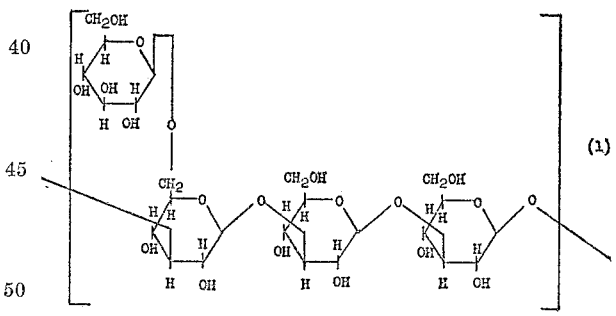

(1)

As illustrated in Formula 1, the glucosylglucan repeating unit comprises multiple glucose molecules which are linked beta 1 to 3 to form the chain skeleton. Onto each third glucose molecule there is appended a glucose molecule linked beta 1 to 6. As used herein, the term "solutions" incorporates dispersions which do not deposit filter cake upon injection into a core sample of a subterranean formation, whether or not the dispersions are true solutions. Also, the term "thickened water" is used to denote the flooding water which has been thickened by addition of a poly(glucosylglucan).

The larger the number of repeating units in the poly(glucosylglucan), i.e., the higher the molecular weight, the higher will be the viscosity of an aqueous solution containing a given weight percent of it. For waterflooding, the molecular weight should be high enough to afford a relatively large increase in the viscosity of the flooding water at a relatively minute concentration. Ordinarily, the poly(glucosylglucan) employed should have a molecular weight such that its 1 percent by weight aqueous solution has a viscosity at 24° C. of from 2,000 to 3,000 centipoises when tested at 30 revolutions per minute on a Brookfield viscometer using a No. 3 spindle. Preferably, it should have a molecular weight such that its 1 percent by weight aqueous solution has the comparable viscosity of about 2,600 centipoises. On the other hand, a poly-(glucosylglucan) having a molecular weight such that its 1 percent by weight aqueous solution has the comparable viscosity as low as 500 centipoises may be employed. However, a concentration disproportionately greater than that of the higher molecular weight poly(glucosylglucan) is necessary to afford the same viscosity in the thickened flooding water.

A satisfactory poly(glucosylglucan) is commercially available under the trade name "Polytetran" from The Pillsbury Company, Minneapolis, Minnesota 55402.

The poly(glucosylglucan) is employed in the flooding water in a concentration sufficient to increase the viscosity of the flooding water. In rare instances, a concentration as small as 0.005 percent by weight of the poly(glucosylglucan) in the flooding water will be satisfactory. Usually, a concentration of from about 0.01 to about 0.3 percent by weight is employed. The preferred concentration range is from about 0.03 to about 0.1 percent by weight. In rare instances in which it is desired to plug partially an extremely permeable strata within a subterranean formation, it may be desirable to employ as high as 1 percent by weight, or more, of the poly(glucosylglucan) in the flooding water.

The thickened flooding water may comprise the entire flooding liquid displacing the oil within the subterranean formation toward the production means. Ordinarily, however, a slug of thickened flooding water of from about 0.01 to about 0.25 pore volume will prove to be economically advantageous in recovering the oil from the subterranean formation.

The poly(glucosylglucan) is subject to bacterial decomposition after a time. Consequently, the flooding water containing the poly(glucosylglucan) loses some of its high viscosity after a period of time in the formation. This bacterial decomposition is prevented by adding to the thickened flooding water a bactericide. The preferred bactericide is formaldehyde. The alkali metal chlorinated phenols, such as sodium pentachlorophenol, may be employed as the bactericide also.

The bactericide is incorporated into the thickened flooding water in an amount sufficient to prevent decay of viscosity through bacterial degradation of the poly(glucosylglucan). Ordinarily, an amount of at least 0.0002 percent by weight is employed. Greater concentrations of bactericide have no adverse effect on the viscosity and may be employed. Ordinarily, it is not economically advantageous to employ more than about 0.5 percent by weight of bactericide in the thickened flooding water.

The viscosity of the flooding water which has been thickened by the addition of the poly(glucosylglucan) is relatively stable over a wide range of pH values, e.g., from a pH of about 1.5 to about 12.0. Preferably, however, the pH of the thickened flooding water is maintained in the range of from about 7.0 to about 10.5. This pH range may be attained by employing in the thickened flooding water an alkali metal hydroxide, an alkaline complex phosphate such as tetrasodium pyrophosphate, or an alkali metal carbonate. The alkali metal carbonates are particularly beneficial since they tend to buffer the pH of the thickened flooding water in the desired range even when added in excess to the amount initially required.

The thickened flooding water recovers more oil when the interfacial tension between it and the in-situ oil is lowered. Preferably, the thickened flooding water has a surfactant dissolved in it.

In an embodiment of the invention, a lowered interfacial tension between the flooding water and the in-situ oil may be effected by flooding ahead of the thickened flooding water a slug of a miscible liquid which contains dissolved therein a surfactant. By miscible liquid is meant a liquid which is miscible with the in-situ oil. Liquid hydrocarbons having boiling points from 30° to 500° F. illustrate suitable miscible liquids. The slug of miscible liquid is about 0.01 to 0.1 the volume of the thickened flooding water. In operation, the miscible liquid displaces the oil. The surfactant reapportions a part of itself into both the oil in advance of the miscible liquid and the thickened flooding water behind it. The surfactant lowers the interfacial tension between the thickened flooding water and the oil or miscible liquid, whichever the thickened flooding water contacts.

Illustrative surfactants which may be employed in either the water or the miscible liquid, or both, are petroleum sulfonates or alkylphenoxypoly(ethyleneoxy)ethanols. The alkali metal salts of the petroleum sulfonates having a molecular weight of from about 300 to about 500 are soluble to an adequate extent in both the aqueous solutions and the miscible liquids and may be employed. Also suitable as surfactants are the alkylphenoxypoly(ethyleneoxy)ethanols in which the alkyl group contains 8 to 9 carbon atoms and in which the poly(ethyleneoxy) group contains 3 to 5 ethyleneoxy groups. These alkylphenoxypoly(ethyleneoxy)ethanols are soluble to an adequate extent in both the aqueous solutions and the miscible liquids.

A concentration of surfactant is employed which will effect lowered interfacial tension between the thickened flooding water and the oil, or the miscible liquid, it displaces within the subterranean formation. Ordinarily, a concentration of from about 0.01 to about 1.0 percent by weight of surfactant is required in the thickened flooding water or in the miscible liquid to be effective.

When the thickened flooding water both has a pH of from about 7 to about 10.5 and contains the surfactant, it is particularly efficacious in recovering oil from a subterranean formation.

Water thickened by the addition of the poly(glucosylglucan) retains its viscosity in the presence of brines, either sodium chloride or calcium chloride brines. Further it does not form precipitates with the divalent ions such as calcium.

Having thus described the invention, it will be understood that such description has been given by way of illustration and example and not by way of limitation, reference for the latter purpose being had to the appended claims.

What is claimed is:

1. A method of recovering oil from an oil-containing subterranean formation penetrated by an injection means and a production means which comprises injecting through said injection means and into said formation flooding water containing a poly(glucosylglucan), the glucosylglucan having the following structural formula:

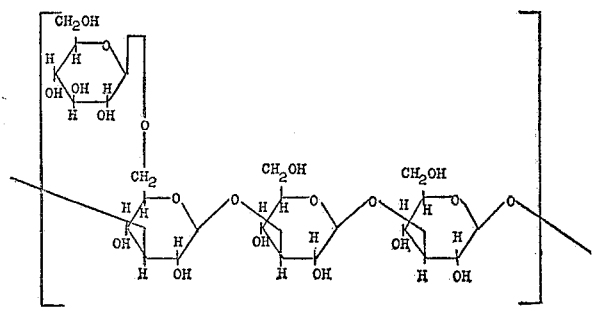

2. The method of claim 1 wherein said poly(glucosylglucan) has a molecular weight such that a 1 percent by weight solution thereof has a viscosity at 24° C. of at least 500 centipoises.

3. The method of claim 1 wherein said poly(glucosylglucan) has a molecular weight such that a 1 percent by weight aqueous solution thereof has a viscosity at 24° C. of from 2,000 to 3,000 centipoises.

4. The method of claim 1 wherein said poly(glucosylglucan) has a molecular weight such that a 1 percent by weight aqueous solution thereof has a viscosity at 24° C. of about 2,600 centipoises.

5. The method of claim 1 wherein said poly(glucosylglucan) is in a concentration of from about 0.005 to about 1.0 percent by weight of said flooding water.

6. The method of claim 5 wherein said poly(glucosylglucan) is in a concentration of from about 0.01 to about 0.3 percent by weight.

7. The method of claim 5 wherein said poly(glucosylglucan) is in a concentration of from about 0.03 to about 0.1 percent by weight.

8. The method of claim 1 wherein said flooding water containing said poly(glucosylglucan) is injected in a volume of from about 0.01 to about 0.25 pore volume.

9. The method of claim 1 wherein said flooding water containing said poly(glucosylglucan) has a pH of from about 7 to about 10.5.

10. The method of claim 1 wherein said flooding water containing said poly(glucosylglucan) also contains a surfactant.

11. The method of claim 10 wherein said surfactant is a water-soluble petroleum sulfonate having a molecular weight of from about 300 to about 500 or a water-soluble alkylphenoxypoly(ethyleneoxy)ethanol wherein said alkyl group contains 8 to 9 carbon atoms and wherein said poly(ethyleneoxy) group contains 3 to 5 ethyleneoxy groups.

12. The method of claim 10 wherein said surfactant is present in a concentration of from about 0.01 to about 1.0 percent by weight of said flooding water containing said poly(glucosylglucan).

13. The method of claim 1 wherein said flooding water containing said poly(glucosylglucan) has a pH of from about 7 to about 10.5 and also contains a surfactant.

14. The method of claim 1 wherein said flooding water containing said poly(glucosylglucan) also contains a bactericide comprising formaldehyde or an alkali metal chlorinated phenol.

15. The method of claim 1 wherein there is injected through said injection means and into said formation immediately preceding said flooding water containing said poly(glucosylglucan) a slug of a liquid which is miscible with the oil and which contains dissolved therein a surfactant.

References Cited
UNITED STATES PATENTS

| | | | |
|---|---|---|---|
| 2,341,500 | 2/1944 | Detling | 166—9 |
| 2,731,414 | 1/1956 | Binder et al. | 166—10 |
| 3,020,207 | 2/1962 | Patton | 195—31 |
| 3,042,611 | 7/1962 | Patton | 166—9 X |
| 3,053,765 | 9/1962 | Sparks | 166—9 X |
| 3,084,122 | 4/1963 | Cypert | 252—8.55 |
| 3,119,812 | 1/1964 | Rogovin | 195—31 XR |
| 3,163,602 | 12/1964 | Lindblom et al. | 252—8.55 |
| 3,208,518 | 9/1965 | Patton | 166—9 |
| 3,305,016 | 2/1967 | Lindblom et al. | 166—9 |
| 3,329,610 | 7/1967 | Kreuz et al. | 166—9 X |

STEPHEN J. NOVOSAD, *Primary Examiner.*